Figure 10:
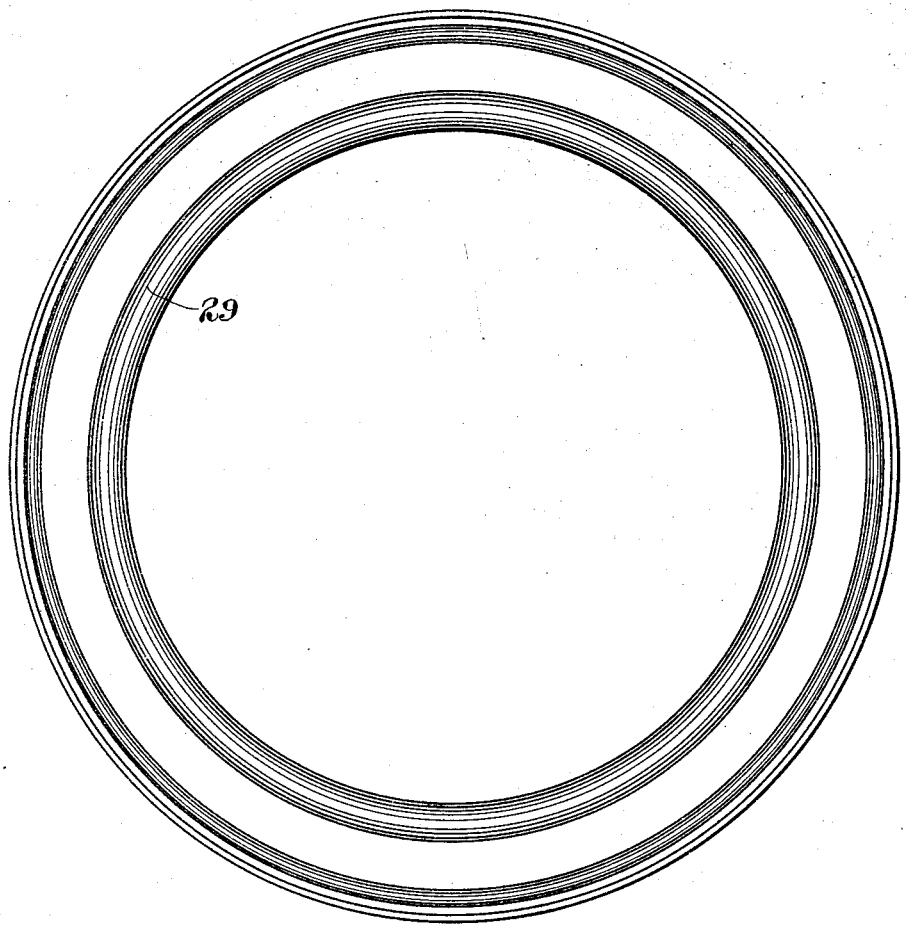

(No Model.) 3 Sheets—Sheet 1.
C. F. PETERSON.
METHOD OF MAKING INSULATOR RINGS.
No. 549,254. Patented Nov. 5, 1895.
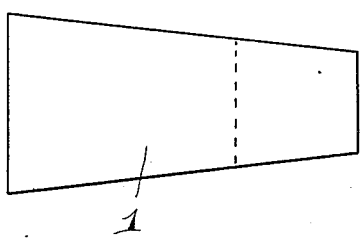
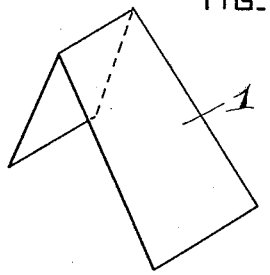
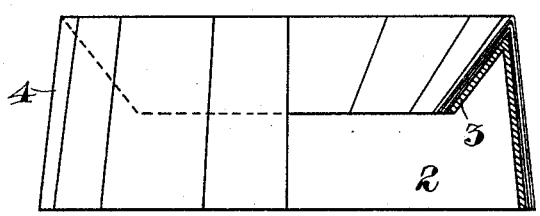
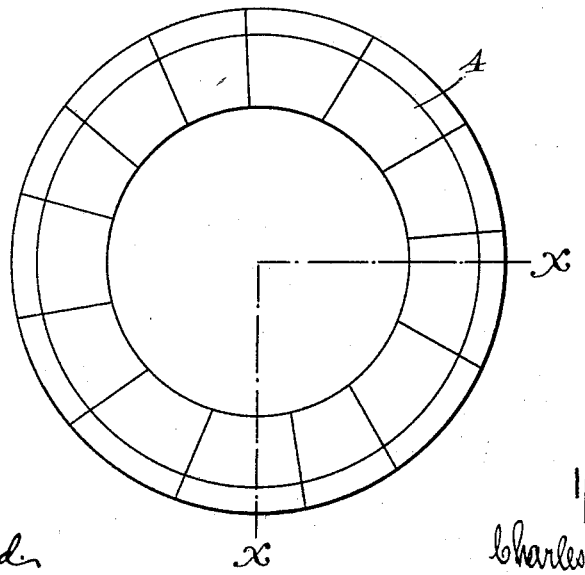
WITNESSES.
A. F. Macdonald
B. B. Hine
INVENTOR.
Charles F. Peterson
by Geo. R. Blodgett.
Atty.

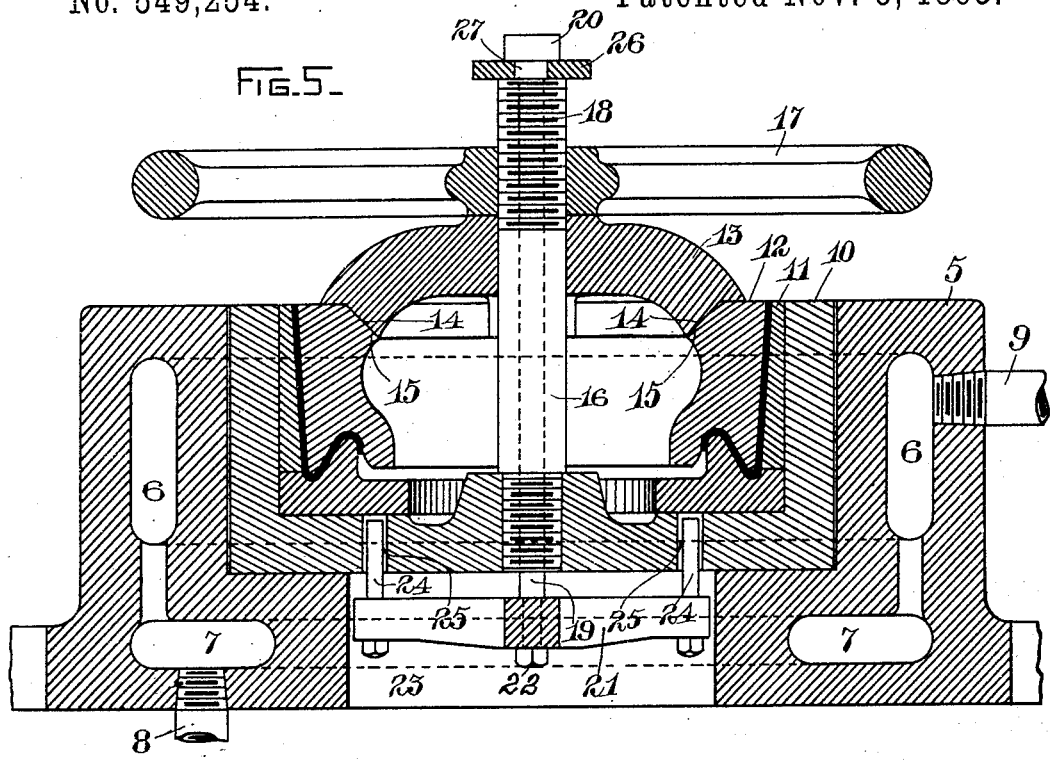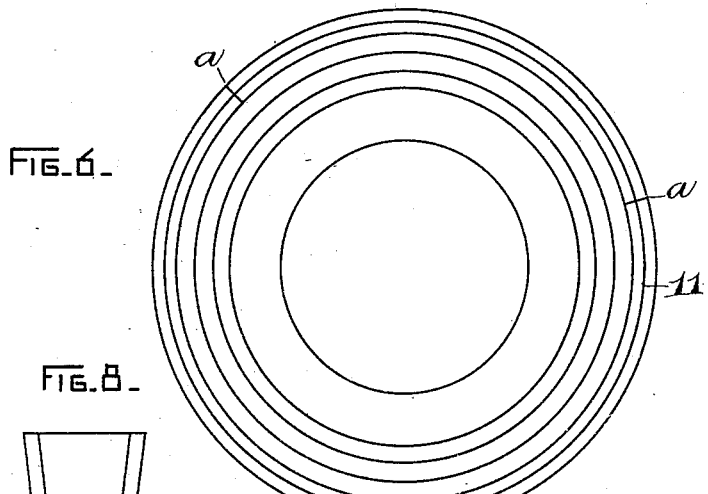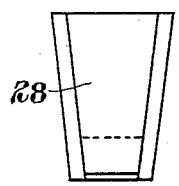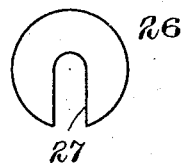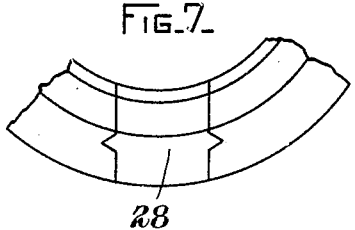

UNITED STATES PATENT OFFICE.

CHARLES F. PETERSON, OF SCHENECTADY, NEW YORK, ASSIGNOR TO THE GENERAL ELECTRIC COMPANY, OF NEW YORK.

METHOD OF MAKING INSULATOR-RINGS.

SPECIFICATION forming part of Letters Patent No. 549,254, dated November 5, 1895.

Application filed June 1, 1895. Serial No. 551,371. (No specimens.)

*To all whom it may concern:*

Be it known that I, CHARLES FREDRIK PETERSON, a citizen of the United States, residing at Schenectady, in the county of Schenectady, State of New York, have invented certain new and useful Improvements in the Method of Making Insulator-Rings, of which the following is a specification.

This invention relates to flanged insulator-rings made of built-up laminæ or pieces of mica.

The invention has for its object to simplify and cheapen the process of making flanged insulator-rings of built-up pieces of mica and thereby provide such rings of irregular shape in one solid piece without seam or joint. These rings are especially adapted for armatures of electrodynamic machines.

This invention consists of a method of forming flanged insulator-rings of built-up pieces of mica, as hereinafter set forth and claimed.

It is a common practice in the art to form built-up mica sheets by placing pieces or laminæ of mica in a sheet overlapping one another and securing them together by gum, shellac, or other suitable adhesive substance. In order to provide flanged insulator-rings of such material, it has been proposed to form such rings by making an annular disk of such built-up mica and by means of a suitable mold pressing such annular disk into the shape of a flanged ring, or, in other words, building a mica sheet by cementing together laminæ of mica scales with overlapping edges, compressing the sheet into the desired form while the cement is wet, drying the cement by evaporating the solvent thereof, and finally chilling the molded mica sheet while under compression. The difficulty with and objection to this method are that the mica scales being very brittle and unyielding, and being connected together with overlapping edges by the cement, will move apart and get out of place when pressure is applied with a mold and cannot be uniformly bent into the irregular shape and flanged form desired without either breaking or being separated from their built-up position, thereby leaving seams and cracks and not affording a solid flanged ring in one piece.

This invention is therefore intended as an improvement on the foregoing method, obviating such difficulty and objection and providing a solid flanged ring or ring of irregular shape in one piece of built-up mica.

This invention is carried out as follows: Pieces or scales of mica are built up by hand and assembled over a mold into the desired shape, the pieces being cemented together by gum-shellac or other suitable binding medium and conforming to the curved parts and other irregular portions of the mold. The ring so formed is then placed in a suitable press conforming to the shape of the ring and pressure and heat are applied, the cement becoming dried and fixed and the ring cooled in the well-known way in this art.

To illustrate the manner of carrying out this invention, reference is had to the accompanying drawings, in which—

Figure 1, Sheet 1, is a face view of a scale or piece of mica of an outline suitable to conform to the shape of the ring to be formed. Fig. 2, Sheet 1, is a view in perspective of the scale or piece of mica shown in Fig. 1 bent into shape by hand. Fig. 3, Sheet 1, shows, partly in vertical section on the line *x x*, Fig. 4, the mold and a flanged ring resting thereon formed of pieces of mica, shown in Fig. 1, bent by hand and assembled into the shape shown in Fig. 2 over a mold. Fig. 4 is a plan view of the flanged ring formed as indicated in Fig. 3. Fig. 5 is a view in vertical section of a press for forming the complete flanged ring from the incomplete ring in Fig. 4 of the outline as shown in heavy black lines in Fig. 5. Fig. 6 is a plan view of the lower die of the press. Fig. 7 is a plan view of a portion of the upper die and one of the expanding-wedges. Fig. 8 is a view in elevation of one of the expanding-wedges. Fig. 9 is a detail view of a part shown in Fig. 5, and Fig. 10 is a plan view of the completed ring.

In carrying out this process scales or pieces of mica 1, preferably of the shape shown in Fig. 1—*i. e.*, quadrangular with inclined sides—are bent by hand, as shown in Fig. 2, over a mold 2 (shown in Fig. 3) with an inwardly flaring or inclined flange 3, and assembled in the shape of a flanged ring 4, (shown in Fig. 4,) the pieces or scales of mica 1 overlapping each other so as to break joints, the outer and inner surfaces of the ring 4 presenting a smooth surface. In this construction the curves of the ring, being formed of the bend in the pieces of mica, will prevent any crack or seam being located at the joint, thereby affording a practically solid piece at those points. In assembling the bent pieces 1 in this manner they are stuck together by gum-shellac or other suitable binding medium, and when the ring 4 is completed it is removed from the mold 2 and placed in the press. (Shown in Fig. 5.)

The press is constructed as follows: 5 is the frame of the press, formed of a circular casting, provided with the circumferential passages 6 7 for the circulation of steam or other heating medium admitted thereto through the inlet-pipe 9 and having its outlet through the discharge-pipe 8. Within a circular chamber in the frame 5 is located a removable circular receptacle 10, in which is located a circular flanged die 11, forming the lower die of the press, the upper die 12, in the form of a ring, resting upon and fitting over the die 11. The transverse meeting surfaces of the dies may be of any corresponding irregular shape desired, while the side adjacent surfaces are vertical planes slightly at an angle. As here shown, the transverse meeting surfaces are of such shape as to form a hook or bent-over end at the edge of the inwardly-inclined flange of the ring 4. Upon the top, adjacent to the inner edge of the die 12, rests the plunger 13 having an inclined bearing portion 14 of its surface resting against a correspondingly inclined surface 15 of the disk 12. Through the plunger 13 extends an upright post 16, upon which the plunger is vertically movable, the lower end of the upright post 16 being fixed in the bottom of the receptacle 10. The plunger 13 is forced down to compress the die 12 against the die 11 by means of the wheel-handle 17, turning on the screw-threaded portion 18 of the post 16 and bearing on the plunger 13.

To release the lower die 11 after the operation, the following device may be employed: A vertically-movable rod 19 is located in and extends through a passage-way in the post 16, having a head 20 at its upper end and a frame 21 mounted on its lower end and secured thereto by a nut 22. The frame 21 is located in an opening 23 in the base of the frame 5. The frame 21 is provided with upwardly-extending projections 24, having their upper ends located in and adapted to move up through holes or passage-ways 25 in the bottom of the receptacle 10. Upon the top of the post 16 is located a metallic disk 26, having the slot 27, as shown in Fig. 9, by means of which it is slipped over the rod 19 and rests on the upper end of post 16. After the insulator-ring has been compressed between the dies the lower die 11 may be released by turning the wheel-handle 17 upward until it bears against the under side of disk 26, when the upward pressure, upon further turning of the wheel-handle 17, causes the frame 21 to be lifted up and through the projections 24 to raise up and release the lower die 11.

The die 11 may be made in sections, as indicated at the points $a$, Fig. 6.

In order to afford lateral as well as vertical pressure on the ring to be formed, the disk 12 is preferably made in sections, and between the sections are placed wedges 28, as shown in Fig. 7, which are forced into position to expand the die 12. It will readily be seen that with the shape and arrangement of the bearing-surfaces of the die 12 and the plunger 13 the made-up insulator-ring 29 will be effectively compressed into a compact form of the desired shape.

A flanged insulator-ring being formed on the mold 2 by hand in the shape shown in Figs. 3 and 4, as already set forth, the disk 26, wheel-handle 17, plunger 13, and die 12 are removed, the ring 4 is placed in the die 11, and the above parts are replaced. Pressure being applied by means of the wheel 17, the ring 4 is pressed into the shape of the ring 29. Steam being constantly admitted before and during the operation of the press, the cement is evaporated and dried by the heat radiating through the press, and the mica scales are solidly secured together. The ring 29 is then removed and chilled and the ring is completed.

Having described my invention, I claim—

The herein described method of forming flanged insulator rings of built-up pieces of mica, which consists in bending pieces of mica, assembling them to form a predetermined shape, cementing them together as the irregular structure is built up, subjecting said structure to pressure and heat, and chilling the same.

In witness whereof I have hereunto set my hand this 22d day of May, 1895.

CHARLES F. PETERSON.

Witnesses:
B. B. HULL,
A. F. MACDONALD.